US007096724B2

(12) United States Patent
Wildman

(10) Patent No.: US 7,096,724 B2
(45) Date of Patent: Aug. 29, 2006

(54) FUEL INJECTOR TESTING SYSTEM

(75) Inventor: Mark A. Wildman, Plainfield, IN (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 36 days.

(21) Appl. No.: 10/813,220

(22) Filed: Mar. 30, 2004

(65) Prior Publication Data

US 2005/0217359 A1 Oct. 6, 2005

(51) Int. Cl.
*G01M 15/00* (2006.01)

(52) U.S. Cl. ...................................... 73/119 A; 73/49.7

(58) Field of Classification Search .................... 73/40, 73/46, 47, 49.2, 49.3, 49.7, 116, 117.1, 118.1, 73/119 R, 119 A See application file for complete search history.

(56) References Cited

U.S. PATENT DOCUMENTS

| | | | | |
|---|---|---|---|---|
| 3,874,225 | A * | 4/1975 | Fegel | 73/40 |
| 5,795,995 | A * | 8/1998 | Shimaoka et al. | 73/40 |
| 2004/0226355 | A1* | 11/2004 | Cho | 73/119 A |

* cited by examiner

*Primary Examiner*—Eric S. McCall
(74) *Attorney, Agent, or Firm*—Elias P. Soupos; Susan L. Lukasik; Dennis K. Sullivan

(57) ABSTRACT

A fuel injector testing system has a sleeve that mechanically isolates one or more test volumes in a fuel injector. The sleeve has interfaces on an inside surface. The interfaces sealably engage the O-rings on the fuel injector. An air displacement mechanism is connected to the sleeve. The air displacement mechanism adds or removes air from the test volumes. The pressure within each test volume is checked to determine whether there is any air leakage from the test volume.

14 Claims, 7 Drawing Sheets

FUEL INJECTOR TESTING SYSTEM

FIELD OF THE INVENTION

This invention generally relates to testing devices for fuel injectors used in internal combustion engines. More particularly, this invention relates to testing devices for testing mechanically or hydraulically activated fuel injectors used in diesel engines.

BACKGROUND OF THE INVENTION

Internal combustion engines convert the chemical energy from a fuel into mechanical energy. The fuel may be petroleum-based, natural gas, another combustible material, or a combination thereof. Most internal combustion engines inject an air-fuel mixture into one or more cylinders. The fuel ignites to generate rapidly expanding gases that actuate a piston in the cylinder. The fuel may be ignited by compression such as in a diesel engine or through some type of spark such as the spark plug in a gasoline engine. The piston usually is connected to a crankshaft or similar device for converting the reciprocating motion of the piston into rotational motion. The rotational motion from the crankshaft may be used to propel a vehicle, operate a pump or an electrical generator, or perform other work. A vehicle may be a truck, an automobile, a boat, or the like.

Many internal combustion engines use a fuel injection system to deliver fuel to the cylinders. Fuel injection systems usually have a fuel injector for each cylinder. The fuel injector usually sprays a measured amount of fuel in the cylinder. In diesel engines, the fuel pressure typically is increased for injecting the fuel near or at the end of the compression cycle. Fuel injectors for diesel engines usually have actuating mechanisms such as a piston to increase the pressure of the fuel. The actuating mechanisms in the fuel injector may be mechanically or hydraulically activated and may be electronically controlled.

Some diesel engines use hydraulically activated electronically controlled unit injection (HEUI) fuel system to inject fuel into the cylinders. A HEUI fuel injection system generally has a fuel injector for each cylinder of the engine. Each fuel injector usually has a control valve, an intensifier, and a nozzle in an injector housing. The control valve starts and stops the fuel injection. The intensifier increases the fuel pressure. The nozzle controls the injection of fuel into the cylinder. The fuel injector generally has a cylindrical configuration with the control valve at one end, the intensifier in the middle, and the nozzle at the other end. The injector housing usually is mounted to the cylinder head of the engine.

To begin fuel injection, the control valve provides high pressure oil to the intensifier. The control valve has a poppet valve connected to an electric solenoid. When energized, the solenoid opens the poppet valve to permit high pressure oil to flow along a passageway into a piston chamber of the intensifier. The high pressure oil may have a pressure in the range of about 500 psi (3 MPa) through about 4,500 psi (31 MPa). When de-energized, the solenoid closes the poppet valve to end the fuel injection.

The intensifier uses the high pressure oil to increase the pressure of the fuel. The intensifier has a piston positioned in the piston chamber. The piston is connected to a plunger that is positioned in a fuel chamber. The high pressure oil entering the piston chamber causes the piston to move the plunger against the fuel in the fuel chamber. The movement of the plunger increases the pressure of the fuel significantly. The fuel pressure may reach a pressure in the range of about 15,000 psi (103 MPa) through about 25,000 psi (172 MPa). The high pressure fuel flows through another passageway to a needle valve in the nozzle.

The nozzle uses the high pressure fuel to control the fuel injection into the cylinder. The high pressure fuel causes the needle valve to open. The high pressure fuel then exits the nozzle through an orifice. The nozzle usually is positioned adjacent to the cylinder for the high pressure fuel to enter the cylinder.

During operation, a fuel injector's piston and other actuating-related components may become worn or scored. Other mechanical difficulties may develop. The difficulties may affect the performance fuel injector and thus the cylinder in the engine.

During engine repairs or maintenance, one or more fuel injectors may be replaced due to operating difficulties with a cylinder. Many service technicians use a vehicle's on-board computer to determine whether to replace a HEUI fuel injector. The on-board computer may determine a HEUI fuel injector needs to be replaced even though the fuel injector is working or can work properly. Cylinders with HEUI fuel injectors are difficult to diagnose using the vehicle's computers and other electronics. The computers typically make comparisons from cylinder to cylinder to determine which cylinders may be contributing less than the other cylinders. These comparisons are not very accurate regarding the fuel injectors because other factors may cause the poor cylinder performance. These factors include the mechanical condition of the engine, the fuel quality at the time of the test, and the like. Some technicians also may replace a fuel injector as part of a general diagnostic approach when there is any mechanical problem or concern with a cylinder. After replacement, the used fuel injector may not be reinstalled in the engine even when the cylinder continues not to work properly. There are fuel injector test devices for testing fuel injectors outside the engine. Many service technicians do not have access to these test devices. The test devices tend to be more expensive and may be bulky to use.

SUMMARY

This invention provides a fuel injector testing system that mechanically isolates one or more test volumes in a fuel injector. The fuel injector testing system changes the amount of air in the test volumes. The test volumes are tested or checked for air leakage.

A fuel injector testing system may have a sleeve, one or more connectors, a tube, and an air displacement mechanism. The sleeve forms a cavity with an inside surface. The sleeve has two or more interfaces on the inside surface. The sleeve forms one or more test orifices to the cavity. The test orifices are positioned between the interfaces. The connectors are mounted on the sleeve. The connectors form a passage to the test orifices. The tube is interchangeably connected to the connectors. The air displacement mechanism is connected to the tube.

A fuel injector testing system for a hydraulically activated electronically controlled unit injection (HEUI) fuel injector may have a sleeve, a first connector, a second connector, a tube, and an air displacement mechanism. The sleeve forms a cavity with an inside surface. The inside surface has a top interface, a middle interface, and a bottom interface. The sleeve forms a first test orifice connected to the cavity. The first test orifice is positioned between the top and middle interfaces. The sleeve forms a second test orifice connected to the cavity. The second test orifice is positioned between the bottom and middle interfaces. The top, middle, and bottom interfaces sealably engage the top, middle, and bottom O-rings on a HEUI fuel injector when the HEUI fuel injector is inserted into the cavity. The sleeve forms a first test volume between the top and middle interfaces when the HEUI fuel injector is inserted into the cavity. The sleeve forms a second test volume between the top and middle interfaces when the HEUI fuel injector is inserted into the cavity. The first and second test volumes extend into HEUI fuel injector. The first and second connecters are mounted on the sleeve. The first connector forms a first passage to the first test orifice. The second connector forms a second passage to the second test orifice. The tube is interchangeably connected to at least one of the first and second test connectors. The air displacement mechanism is connected to the tube.

In a method for testing a fuel injector, one or more test volumes are mechanically isolated on a fuel injector with a sleeve. The amount of air is changed in the test volumes. The test volumes are tested for air leakage.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
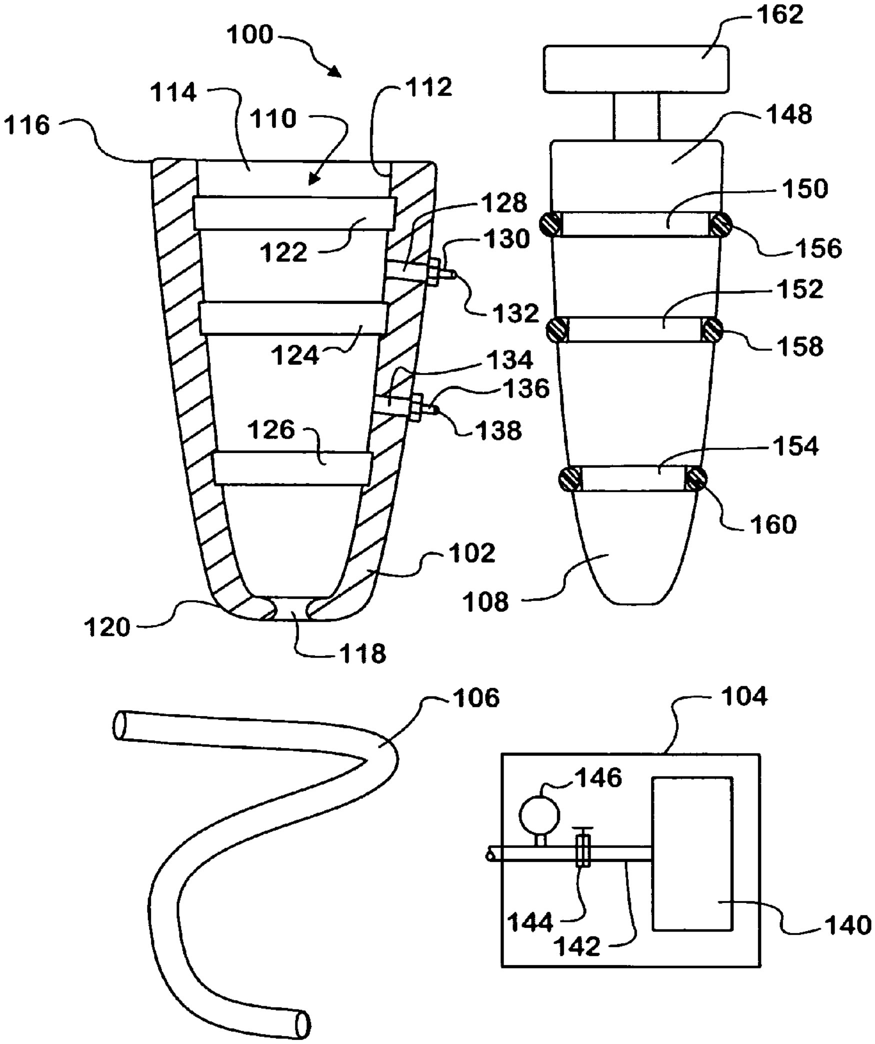
FIG. 1 is a schematic view of an unassembled fuel injector test system.
Figure 2:
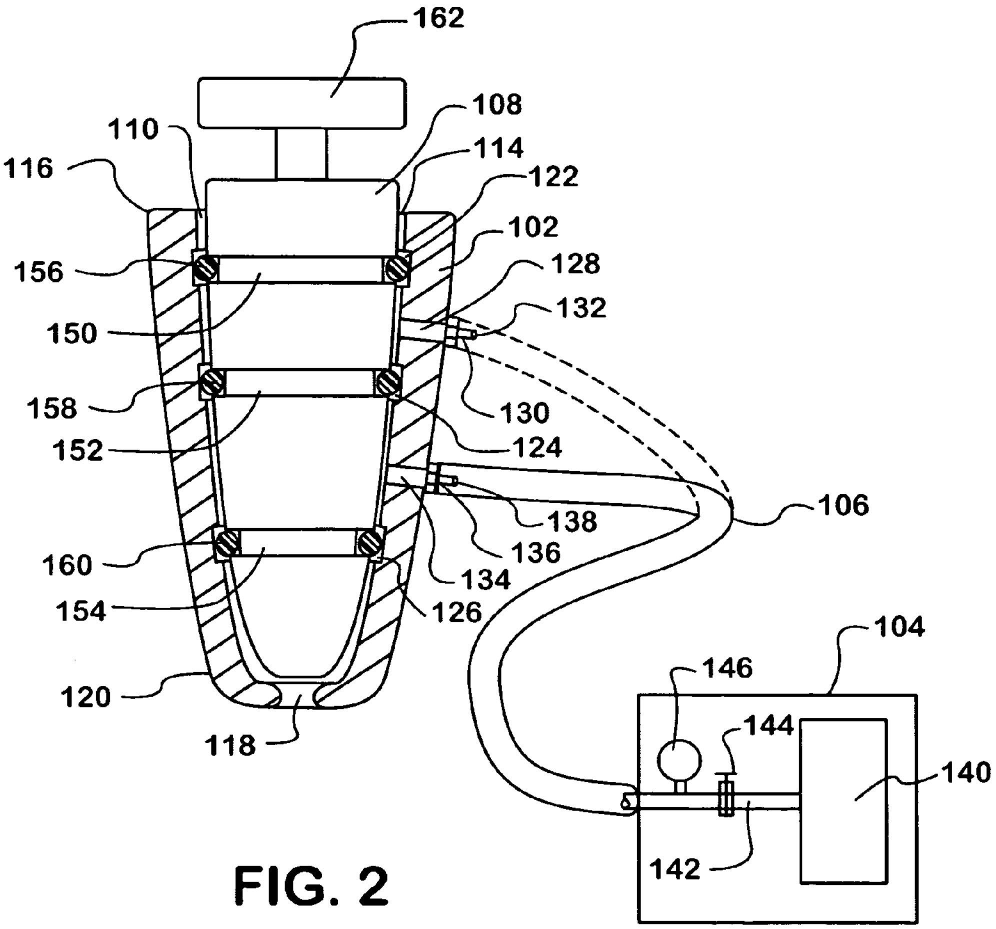
FIG. 2 is a schematic view of an assembled fuel injector test system.

FIGS. 1–2 are various views of a fuel injector test system 100. The fuel injector test system 100 may be used to test a mechanically activated fuel injector, a hydraulically activated fuel injectors, and the like. The fuel injector test system 100 may be used to test a hydraulically activated electronically controlled unit injection (HEUI) fuel injector. The fuel injector test system 100 includes a sleeve 102, an air displacement mechanism 104, a tube 106, and a test plug 108. During testing, a fuel injector is placed into the sleeve 102. The sleeve 102 mechanically isolates one or more test volumes within the fuel injector. A test volume may include one or more of the actuating and actuating-related components in the fuel injector. Actuating components include a poppet valve, a piston, a plunger, and the like. Actuating-related components include a fuel chamber, an oil passage, and the like. The air displacement mechanism 104 is connected to a test volume by the tube 106. The air displacement mechanism 104 changes the amount of air in the test volume. The resulting vacuum or pressurized level is monitored during a selected time period to determine whether any air leakage occurs from the test volume. If the vacuum or pressurized level changes beyond a selected tolerance, the test volume is deemed to have a leak. While a particular configuration is shown for the fuel injector test system 100, other configurations may be used including those with additional components.

For illustration purposes, the fuel injector system 100 is configured for use with a HEUI fuel injector. The fuel injector system 100 may be configured for use with other types of fuel injectors including fuel injectors that are mechanically or hydraulically activated. The sleeve, other components, and test parameters may be modified for use with one or more types of fuel injector.

In FIGS. 1–2, the sleeve 102 forms a cavity 110 with an inside surface 112 configured to receive a HEUI fuel injector. The sleeve 102 forms an opening 114 into the cavity 110 at a top end 116. The sleeve 102 forms an aperture 118 into the cavity 110 at a bottom end 120. The opening 114 has a cross-section larger than the cross-section of the HEUI fuel injector. The aperture 118 has a cross-section smaller than the cross-section of the HEUI fuel injector, but larger than the cross-section of the nozzle of the HEUI fuel injector. The sleeve 102 may be configured to receive fuel injectors of one or more sizes. There may be multiple sleeves in the fuel injector test system with each sleeve configured to receive a fuel injector of a different size. The sleeve may be made of metal, plastic, or like material. The sleeve may be made of aluminum or an aluminum-alloy.

The inside surface 112 has a top interface 122, a middle interface 124 and a bottom interface 126. The interfaces 122, 124, and 126 each define a contact surface along the circumference of the inside surface 112. The sleeve 102 also forms a first test orifice 128 into the cavity 110 at a position between the top interface 122 and the middle interface 124. A first connector 130 is connected to the sleeve 102 above or into the first test orifice 128. The first connector 130 forms a first passage 132 connected to the first test orifice 128. The sleeve 102 also forms a second test orifice 134 into the cavity 110 at a position between the bottom interface 126 and the middle interface 124. A second connector 136 is connected to the sleeve 102 above or into the second test orifice 134. The second connector 136 forms a second passage 138 connected to the second test orifice 134.

When a HEUI fuel injector is positioned in the cavity 110, the top O-ring, middle O-ring, and bottom O-ring of the fuel injector sealably engage the contact surfaces of the top interface 122, the middle interface 124, and the bottom interface 126, respectively. The interfaces 122, 124, and 126 sealably engage or form essentially air-tight seals with the respective O-ring. The nozzle of the fuel injector extends through the aperture 118. The nozzle of the fuel injector may contact the bottom end 120. The nozzle may not contact or be supported by the bottom end 120. The nozzle of the fuel injector may not contact or be supported by the bottom end 120. The contact surfaces may have a pattern, texture or other surface treatment to improve the seal between the O-rings and the interfaces. The weight of the fuel injector may bias the O-rings against the respective contact surfaces.

The sleeve 102 may have a clamp or other holding device (not shown) to hold the fuel injector in the cavity 110 during the test.

The sleeve 102 mechanically isolates a first test volume between the top and middle O-rings on the outside of the fuel injector. The first test volume extends inside the fuel injector to include the oil passageway where high pressure oil may enter and move through the poppet valve. The top interface 122 forms an essentially air-tight seal with the top O-ring above the oil entrance to the fuel injector. The middle interface 122 forms an essentially air-tight seal with the middle O-ring below the oil entrance to the fuel injector. When working properly, the poppet valve may form an essentially airtight seal of the passageway. When not working properly, poppet valve may leak or permit air to pass through the oil passageway into or out of the oil discharge opening. The poppet valve may not be working properly due to wear, scratches, manufacturing defects, and the like. The oil discharge opening is above the top O-ring on the fuel injector. There may be other leaks in the oil passageway. Air may leak out of other openings in the fuel injector.

The sleeve 102 also mechanically isolates a second test volume between the bottom and middle O-rings on the outside of the fuel injector. The second test volume extends inside the fuel injector to include the fuel passageway and the fuel chamber. The bottom interface 126 forms an essentially air-tight seal with the bottom O-ring below the fuel entrance to the fuel injector. The middle interface 122 forms an essentially air-tight seal with the middle O-ring above the fuel entrance to the fuel injector. When working properly, the plunger may form an essentially airtight seal of the fuel chamber. When not working properly, plunger may leak or permit air to pass through the fuel chamber and out of the fuel injector. The plunger may be working properly due to wear, scratches, manufacturing defects, and the like. There may be other leaks in the fuel passageway. Air may leak out of other openings in the fuel injector.

The air displacement mechanism 104 may have an air pump 140, an air passage 142, a valve 144, and a pressure gauge 146. The air passage 142 connects the valve 144 and pressure gauge 146 to the air pump. The valve 144 and pressure gauge 146 may be separate components. The air displacement mechanism 104 may be powered by household current, a battery pack, a connection to the battery in a vehicle, a combination thereof, and the like. The air displacement mechanism 104 may have other air pumps, air passages, valves, and gauges. The air displacement mechanism 104 may have other configurations including those with additional components such as control circuitry, a timer, and the like.

The air pump 140 may remove air from the air passage 142 to reduce the air pressure or form a vacuum. The air pump 140 may add air to the air passage 142 to increase the air pressure. A vacuum includes the partial or complete removal of air from a volume. The change to lower or higher air pressure may be in relation to the ambient pressure, a standard press such as atmospheric pressure, or the like. The air pump 140 may be reversible; adding air to the air passage 142 at a selected time, and removing air from the air passage 142 at another selected time.

The valve 144 may be a ball valve. The valve 144 may be a combination of a check valve with a bleed valve. Other valves may be used. The valve 144 is positioned on the air passage 142 at a position between the air pump 140 and the pressure gauge 146.

The pressure gauge 146 may be analog or digital. There may be multiple pressure gauges. There may be separate gauges for measuring pressures higher than atmospheric pressure and for measuring a vacuum or pressures lower than atmospheric. There may be one gauge for measuring both pressures higher than atmospheric pressure and for measuring a vacuum or pressures lower than atmospheric. Other gauges may be used.

The test plug 108 has an outside surface 148 with a similar configuration as the injector housing of a fuel injector. The outside surface 148 forms an upper groove 150, a center groove 152, and a lower groove 154. An upper O-ring 156 is disposed in the upper groove 150. A center O-ring 158 is disposed in the center groove 152. A lower 160 O-ring is disposed in the lower groove 154. The test plug 108 may have a handle 162.

When the test plug 108 is positioned in the cavity 110 of the sleeve 102, the test plug 108 mechanically isolates a first check volume and a second check volume. The first check volume extends between the upper O-ring 156, the center O-ring 158, the outside surface 148 of the test plug 108, and the inside surface 112 of the sleeve 102. The second check volume extends between the lower O-ring 160, the center O-ring 158, the outside surface 148 of the test plug 108, and the inside surface 112 of the sleeve 102. The upper O-ring 156, the center O-ring 158, and the lower O-ring 160 engage the contact surfaces of the top interface 122, the middle interface 124, and the bottom interface 126, respectively. The interfaces 122, 124, and 126 sealably engage or form essentially air-tight seals with the O-rings 156, 158, and 160, respectively. The test plug 108 may not contact the bottom end 120 of the sleeve 102. The test plug 108 may contact or rest on the bottom end 120 of the sleeve 102. The weight of the test plug 108 may bias the O-rings 156, 158, and 160 against the respective contact surfaces of the interfaces 122, 124, and 126.

Figure 3:
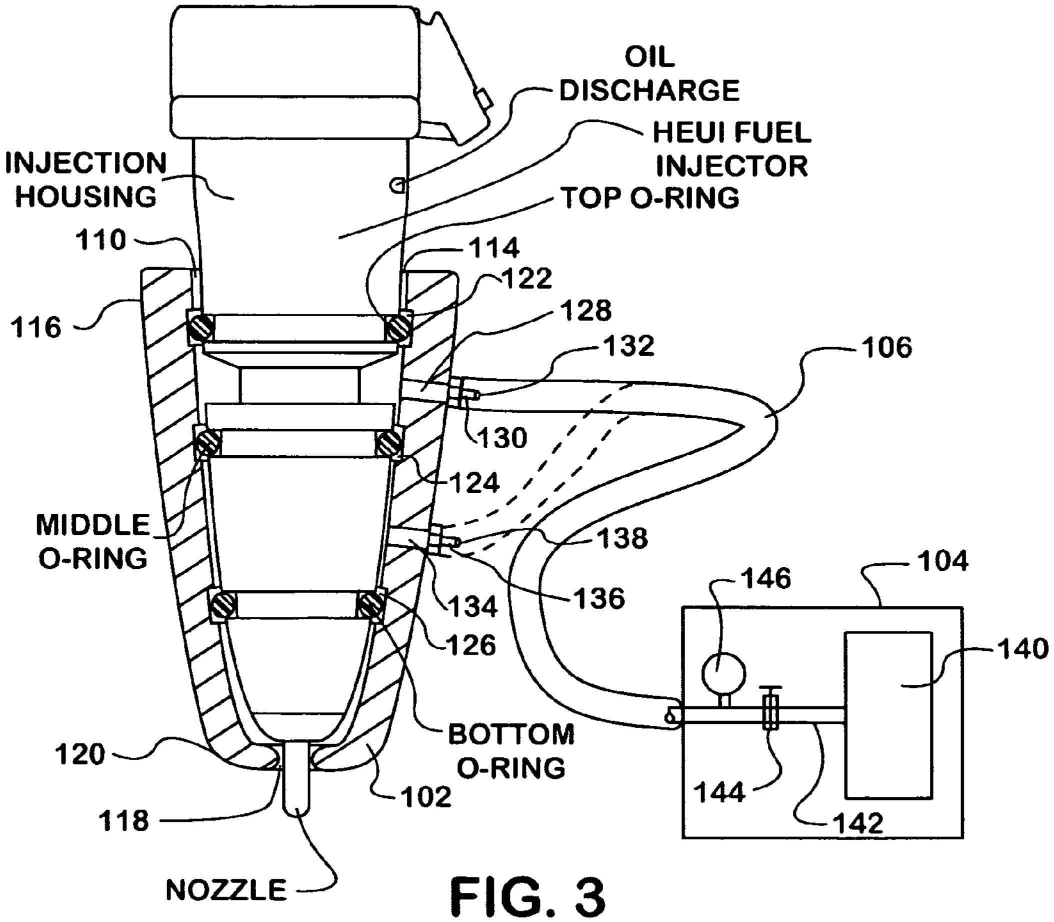
FIG. 3 is a schematic view of a fuel injector test system with a hydraulically activated electronically controlled unit injection (HEUI) fuel injector.
Figure 4:
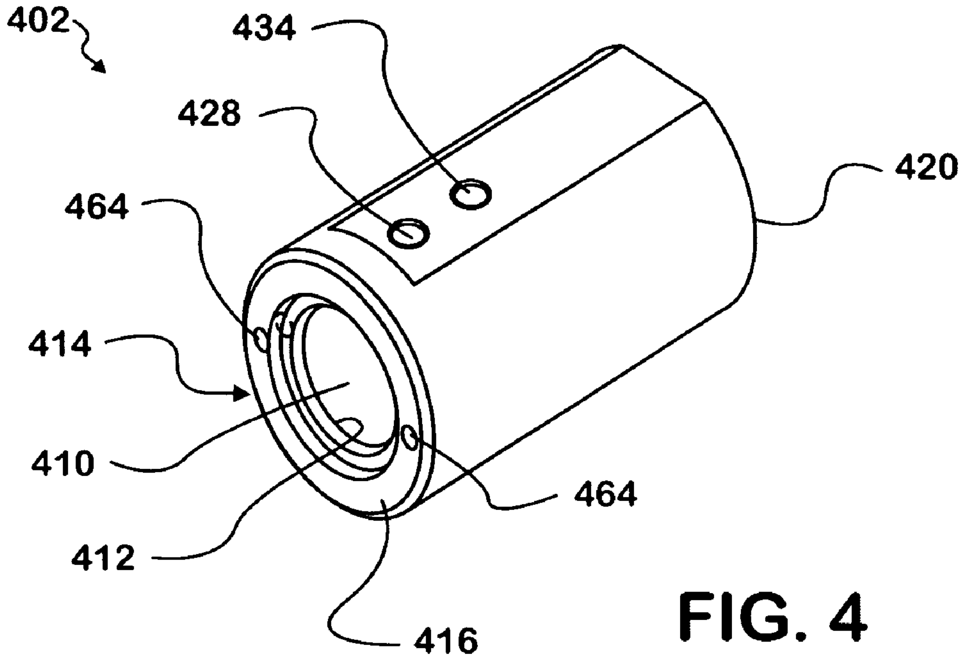
FIG. 4 is a perspective view of another sleeve for a fuel injector test system.
Figure 5:
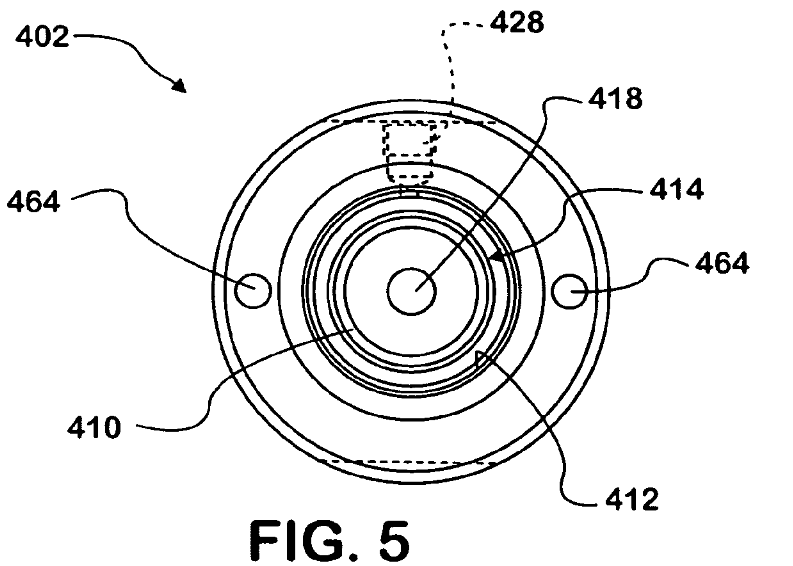
FIG. 5 is a top view of the sleeve of FIG. 4.
Figure 6:
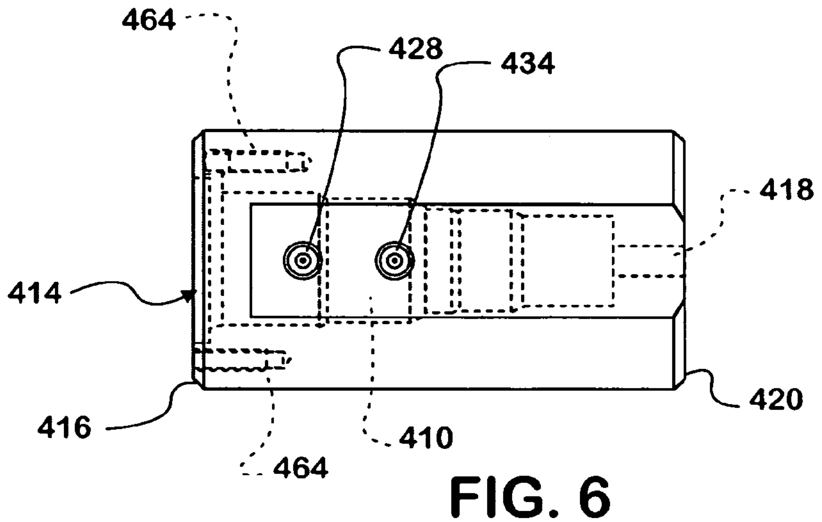
FIG. 6 is a side view of the sleeve of FIG. 4.
Figure 7:
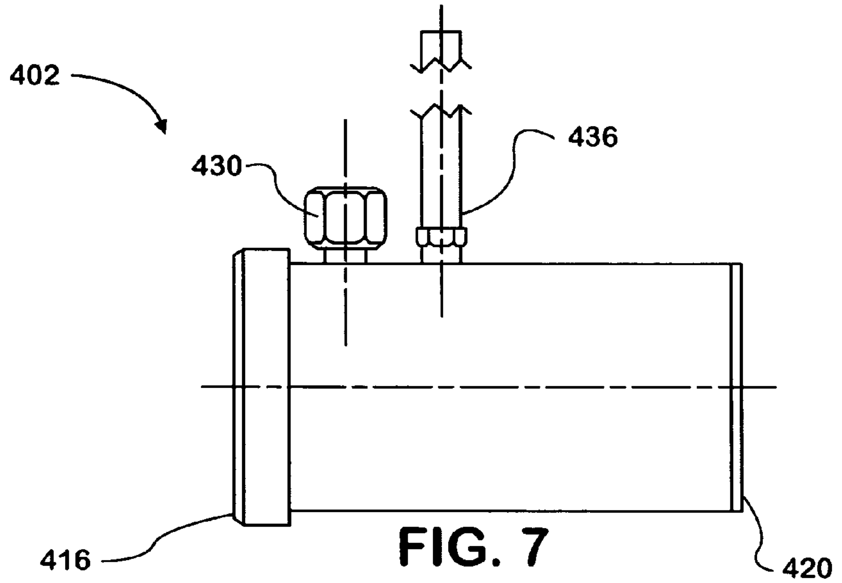
FIG. 7 is another side view of the sleeve of FIG. 4.
Figure 8:
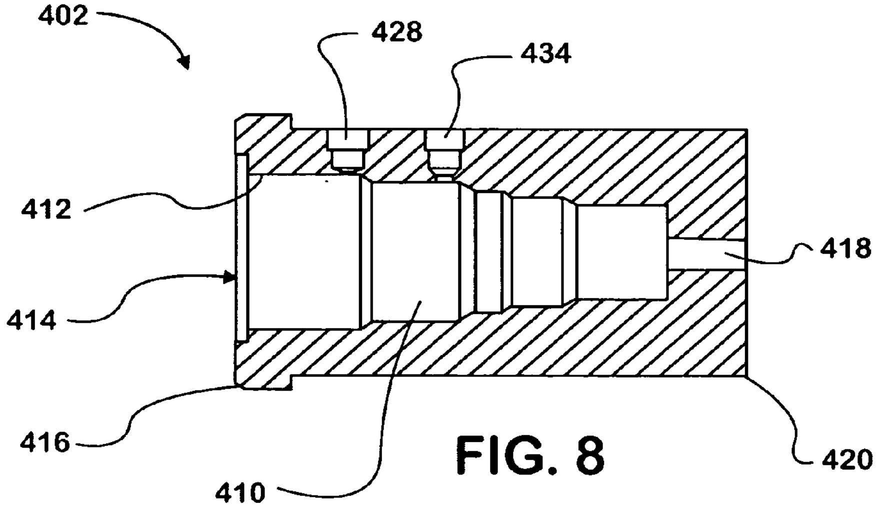
FIG. 8 is a cross-section view of the sleeve of FIG. 4.

FIG. 3 is a schematic view of the fuel injector test system 100 with a hydraulically activated electronically controlled unit injection (HEUI) fuel injector inserted into the cavity 110. The sleeve 102 mechanically isolates a first test volume that extends from the top and middle O-rings outside the fuel injector into the oil passageway inside the fuel injector. The sleeve 102 also mechanically isolates a second test volume that extends from the bottom and middle O-rings outside the fuel injector into the fuel passageway and fuel chamber inside the fuel injector. The top O-ring, middle O-ring, and bottom O-ring of the fuel injector sealably engage the top interface 122, the middle interface 124, and the bottom interface 126, respectively. The interfaces 122, 124, and 126 each form an essentially air-tight seal with the respective O-ring. The nozzle of the fuel injector extends through the aperture 118.

During testing, the tube 106 is connected to the air passage 142 of the air displacement mechanism 104. The tube 106 also is interchangeably connected to either the first connector 130 or the second connector 134. After the test is completed for one test volume, the tube is interchangeably connected to the other test connector for completion of the test on the other test volume. Interchangeably connected includes connections where the tube may be connected to one test connector for a test, disconnected from the test connector, and then connected to another test connector for another test. When testing of the first and second test volumes is completed, the tube 106 is disconnected from the sleeve 102 and the air displacement mechanism 104. The fuel injector is removed from the sleeve 102 when testing is completed. The tube 106 may be made from a flexible plastic, elastomer, or like material. The tube 106 may have a "Y" configuration for connection to both the first connector 130 and the second connector 132 at the same time.

To test for air leakage, air is added to or removed from the test volumes. Air may be added to both test volumes. Air may be removed from both test volumes. Air may be added to one test volume and removed from the other test volume.

To test the first test volume for air leakage, the tube 106 is connected to the first connector 130. The valve 144 is opened. The air pump 140 is activated to add or remove air from the first test volume.

When the air pump is activated to remove air from the first test volume, the loss of air creates a vacuum or reduces the air pressure in the first test volume. The decreased pressure in the first test volume may be monitored via the pressure gauge 146. When the pressure is reduced to a selected vacuum level, the valve 144 is closed and the air pump 140 is deactivated. The pressure is checked after a vacuum time period has lapsed to determine whether there is air leakage into the first test volume. If there is air leakage, the pressure may rise above the selected vacuum level even with the valve 144 closed. If the pressure exceeds a vacuum tolerance above the selected vacuum level, the fuel injector may be deemed to have a leak in the first test volume. The vacuum tolerance is the maximum allowable difference between the selected vacuum level and the pressure when the vacuum time period has lapsed. If the pressure does not exceed the vacuum tolerance, the fuel injector may be deemed to not have a leak. If the air pump 140 cannot remove air or create a vacuum in the first test volume, the fuel injector may be deemed to have a leak. When the testing of the first test volume is completed, the valve 144 is opened.

When the air pump is activated to add air to the first test volume, the additional air increases the air pressure in the first test volume. The increased pressure in the first test volume may be monitored via the pressure gauge 146. When the pressure increases to a selected pressure level, the valve 144 is closed and the air pump 140 is deactivated. The pressure is checked after a pressure time period has lapsed to determine whether there is air leakage out of the first test volume. The pressure may fall below the selected pressure level even with the valve 144 closed when air leakage is present. If the pressure is less than a pressure tolerance under the selected pressure level, the fuel injector may be deemed to have a leak in the first test volume. The pressure tolerance is the maximum allowable difference between the selected pressure level and the pressure when the pressure time period has lapsed. If the pressure is not below the pressure tolerance, the fuel injector may be deemed to not have a leak. If the air pump 140 cannot add air or increase pressure in the first test volume, the fuel injector may be deemed to have a leak. When the testing of the first test volume is completed, the valve 144 is opened.

To test the second test volume for air leakage, the tube 106 is connected to the second connector 136. The valve 144 is opened. The air pump 140 is activated to add or remove air from the second test volume.

When the air pump is activated to remove air from the second test volume, the loss of air creates a vacuum or reduces the air pressure in the second test volume. The decreased pressure in the second test volume may be monitored via the pressure gauge 146. When the pressure is reduced to a selected vacuum level, the valve 144 is closed and the air pump 140 is deactivated. The pressure is checked after a vacuum time period has lapsed to determine whether there is air leakage into the second test volume. The pressure may exceed the selected vacuum level even with the valve 144 closed when there is leakage age. If the pressure exceeds the vacuum tolerance above the selected vacuum level, the fuel injector may be deemed to have a leak in the second test volume. If the pressure does not exceed the vacuum tolerance, the fuel injector may be deemed to not have a leak. If the air pump 140 cannot remove air or create a vacuum in the second test volume, the fuel injector may be deemed to have a leak. When the testing of the second test volume is completed, the valve 144 is opened.

When the air pump is activated to add air to the second test volume, the additional air increases the air pressure in the second test volume. The increased pressure in the second test volume may be monitored via the pressure gauge 146. When the pressure increases to a selected pressure level, the valve 144 is closed and the air pump 140 is deactivated. The pressure is checked after a pressure time period has lapsed to determine whether there is air leakage out of the second test volume. The pressure may fall below the selected pressure level even with the valve 144 closed when there is air leakage. If the pressure is less than a pressure tolerance under the selected pressure level, the fuel injector may be deemed to have a leak in the second test volume. If the pressure is not less than the pressure tolerance, the fuel injector may be deemed to not have a leak. If the air pump 140 cannot add air or increase pressure in the second test volume, the fuel injector may be deemed to have a leak. When the testing of the second test volume is completed, the valve 144 is opened.

The selected vacuum level may be about 27 inches of Hg (686 Torr). The selected vacuum level may be in the range of about 25 inches of Hg (635 Torr) through about 29 inches of Hg (737 Torr). The tests on the first and second test volumes may use different selected vacuum levels. Other vacuum levels may be used.

The vacuum tolerance may be 0.25 inches of Hg (6 Torr). The vacuum tolerance may be in the range of about 0 through about 0.5 inches of Hg (11 Torr). The tests on the first and second test volumes may use different vacuum tolerances. Other tolerances may be used.

The vacuum time period may be about 6 minutes. The vacuum time period may be in the range of about 5 minutes through about 7 minute. The tests on the first and second test volumes may use different vacuum time periods. Other time periods may be used.

The selected pressure level may be about 33 inches of Hg (838 Torr). The selected pressure level may be in the range of about 31 inches of Hg (787 Torr) through about 35 inches of Hg (889 Torr). The tests on the first and second test volumes may use different selected pressure levels. Other pressure levels may be used.

The pressure tolerance may be 0.25 inches of Hg (6 Torr). The pressure tolerance may be in the range of about 0 through about 0.5 inches of Hg (11 Torr). The tests on the first and second test volumes may use different pressure tolerances. Other tolerances may be used.

The pressure time period may be about 6 minutes. The pressure time period may be in the range of about 5 minutes through about 7 minute. The tests on the first and second test volumes may use different pressure time periods. Other time periods may be used.

Prior to or after testing a fuel injector, the sleeve 102 may be checked to determine whether there are any air leakage at the interfaces 122, 124, and 126 or other locations on the inside surface 112. The test plug 108 is inserted into the cavity 110. The sleeve 102 mechanically isolates a first check volume between the upper O-ring 156 and the center O-ring 158. The sleeve 102 also mechanically isolates a second check volume between the lower O-ring 160 and the center O-ring 158. The upper O-ring 156, center O-ring 158, and lower O-ring 160 of the test plug 108 sealably engage the top interface 122, the middle interface 124, and the bottom interface 126, respectively. The interfaces 122, 124, and 126 each form an essentially air-tight seal with the respective O-ring. The plug may form one or other multiples of check volumes with the sleeve 102.

After the test plug 108 is inserted into the sleeve, the first and second check volumes are tested in substantially the same manner as the first and second test volumes of a fuel injector as previously discussed. The selected vacuum and selected pressure levels may be essentially the same as the test parameters for tests on a fuel injector. The vacuum and pressure tolerances may be essentially the same as the test parameters for tests on a fuel injector. The vacuum and pressure time periods may be essentially the same as the test parameters for tests on a fuel injector. Other test parameters may be used. If air leakage is detected using the test plug, the sleeve 102 may be reconditioned or discarded.

FIGS. 4-8 are various views of another sleeve 402 for a fuel injector test system. The sleeve 402 forms a cavity 410 with an inside surface 412. The sleeve 402 forms an opening 414 into the cavity 410 at a top end 416. The sleeve 402 forms an aperture 418 into the cavity 410 at a bottom end 420.

The sleeve 402 also forms a first test orifice 428 and a second test orifice 434, which extend into the cavity 410. A first connector 430 is connected to the sleeve 402 above or into the first test orifice 428. The first connector 430 forms a first passage connected to the first test orifice 428. A second connector 436 is connected to the sleeve 402 above or into the second test orifice 434. The second connector 436 forms a second passage connected to the second test orifice 434.

The sleeve 402 forms support holes 464 on the top end 416. The support holes 464 receive bolts or other connection devices to hold the fuel injector in the cavity 410 during the test. The support holes 464 may be threaded.

The inside surface 412 is configured to receive a HEUI fuel injector. When a HEUI fuel injector is positioned in the cavity 410, the O-rings of the fuel injector sealably engage the inside surface 412. Sealably engage includes an essentially air-tight seal between a O-ring and the inside surface 412. The contact of the O-rings with the inside surface 412 mechanically isolates first and second test volumes in the HEUI fuel injector. The nozzle of the fuel injector extends through the aperture 418.

Figure 9:
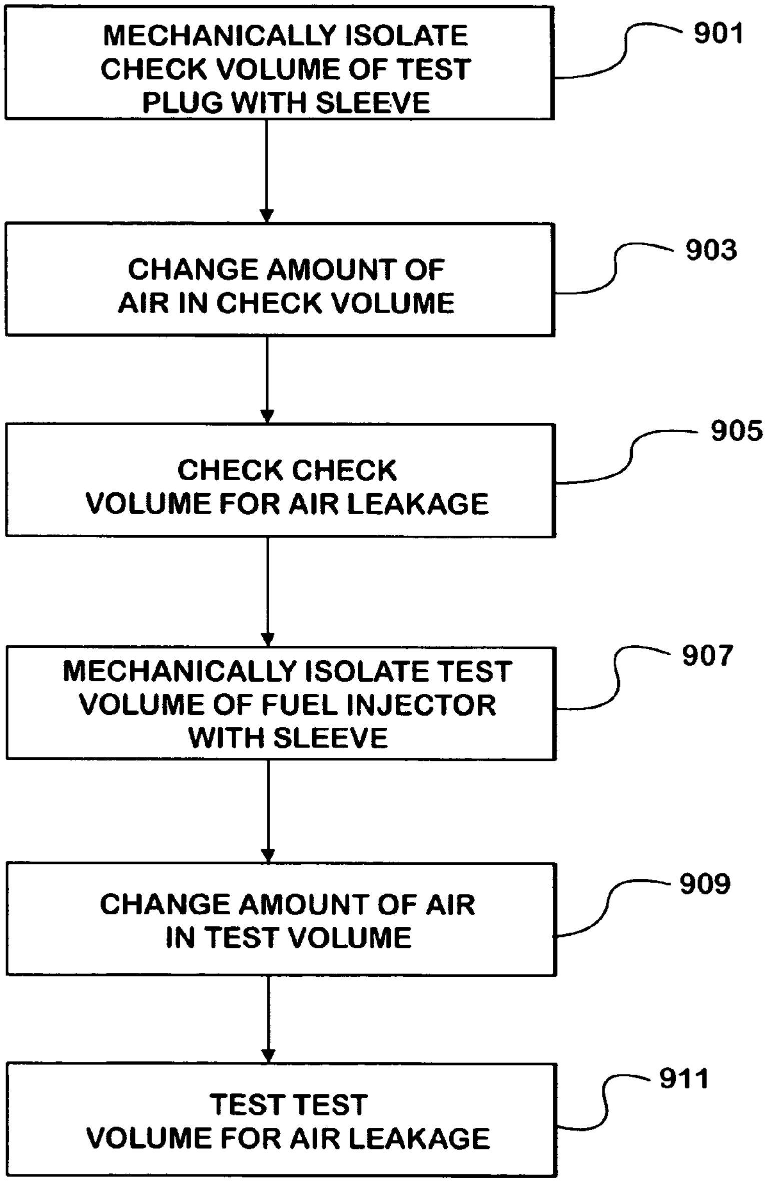
FIG. 9 is a flowchart of a method for testing a fuel injector.

FIG. 9 is a flowchart of a method for testing a fuel injector. One or more test volumes in the fuel injector are mechanically isolated, have air added or removed, and then are checked for air leakage as previously discussed.

In block 901, one or more check volumes are mechanically isolated by a sleeve. When a test plug is inserted into the sleeve, the O-rings on the test plug sealably engage the respective interfaces on the inside of the sleeve. Each O-ring forms an essentially air-tight seal along the contact surface with the respective interface. The check volumes are formed between the O-rings.

In block 903, the amount of air in each check volume is changed. Air may be added to or removed from the check volumes. Air may be added to a check volume until the pressure reaches a selected pressure level. Air may be removed from a check volume until the pressure reaches a selected vacuum level.

In block 905, the check volume is checked for air leakage. If air was added to a check volume, the pressure is checked after a pressure time period to determine whether there is a leak. If the pressure is less than a pressure tolerance under the selected pressure level, the sleeve may be deemed to have a leak. If the pressure is less than the pressure tolerance, the sleeve may be deemed to not have a leak. If air was removed from a check volume, the pressure is checked after a vacuum time period to determine whether there is a leak. If the pressure is more than a vacuum tolerance above the selected vacuum level, the sleeve may be deemed to have a leak. If the pressure is not more than the vacuum tolerance, the sleeve may be deemed to not have a leak.

In block 907, one or more test volumes are mechanically isolated by a sleeve. When a fuel injector is inserted into the sleeve, the O-rings on the fuel injector sealably engage the respective interfaces on the inside of the sleeve. Each O-ring forms an essentially air-tight seal along the contact surface with the respective interface. The test volumes are formed between the O-rings and extend into the fuel injector.

In block 909, the amount of air in each test volume is changed. Air may be added to or removed from the test volumes. Air may be added to a test volume until the pressure reaches a selected pressure level. Air may be removed from a test volume until the pressure reaches a selected vacuum level.

In block 911, the test volume is tested for air leakage. If air was added to a test volume, the pressure is checked after a pressure time period to determine whether there is air leakage. If the pressure is less than a pressure tolerance under the selected pressure level, the fuel injector may be deemed to have a leak. If the pressure is less than the pressure tolerance, the fuel injector may be deemed to not have a leak. If air was removed from test volume, the pressure is checked after a vacuum time period to determine whether there is a leak. If the pressure is higher than a vacuum tolerance above the selected vacuum level, the fuel injector may be deemed to have a leak. If the pressure is not higher than the vacuum tolerance, the fuel injector may be deemed to not have a leak.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method for testing a fuel injectors, comprising the steps of:

mechanically isolating at least one test volume of the fuel injector that is disposed within a sleeve;

changing the amount of air in the at least one test volume;

testing the at least one test volume for air leakage;

removing the fuel injector from the sleeve;

inserting a test plug in the sleeve;

mechanically isolating at least one check volume of the test plug with the sleeve;

changing the amount of air in the at least one check volume; and testing the at least one check volume for air leakage.

2. The method for testing a fuel injector of claim 1, further comprising the step of sealably engaging at least two O-rings on the fuel injector with at least two interfaces on the sleeve.

3. The method for testing a fuel injector of claim 1, further comprising the step of sealably engaging at feast two O-rings on the test plug with at least two interfaces on the sleeve.

4. The method for testing a fuel injector of claim 1, where the fuel injector is a hydraulically activated electronically controlled unit injection (HEUI) fuel injector.

5. The method for testing a fuel injector of claim 1, further comprising the steps of:

adding air to the at least one test volume until the at least one test volume reaches a selected pressure level; and after a time period, determining whether the at least one test volume has a pressure less than a tolerance below the selected pressure level.

6. The method for testing a fuel injector of claim 5, wherein the selected pressure level is in the range of about 31 inches Hg (787 torr) through about 35 inches Hg (889 Torr); wherein the time period is in the range of about 5 minutes through about 7 minutes; and wherein the tolerance is in the range of about 0 through about 0.5 inches of Hg (11 Torr).

7. The method for testing a fuel Injector of claim 1, further comprising the steps of:

removing air from the at least one test volume until the at least one test volume reaches a selected vacuum level; and after a time period, determining whether the at least one test volume has a pressure more than a tolerance above the selected vacuum level.

8. The method for testing a fuel injector of claim 7, wherein the selected vacuum level is in the range of about 25 inches Hg (635 Torr) through about 29 inches Hg (737 Torr), wherein the time period is in the range of about 5 minutes through about 7 minutes, and wherein the tolerance is in the range of about 0 through about 0.5 inches of Hg (11 Torr).

9. The method for testing a fuel injector of claim 1, further comprising the steps of:

adding air to the at least one check volume until the at least one check volume reaches a selected pressure level; and after a time period, determining whether the at least one check volume has a pressure less than a tolerance below the selected pressure level.

10. The method for testing a fuel injector of claim 9, wherein the selected pressure level is in the range of about 31 Inches Hg (787 Torr) through about 35 inches Hg (889 Torr); wherein the time period is in the range of about 5 minutes through about 7 minutes; and wherein the tolerance is in the range of about 0 through about 0.5 inches of Hg (11 Torr).

11. The method for testing a fuel injector of claim 1, further comprising the steps of:

removing air from the at least one check volume until the at least one check volume reaches a selected vacuum level; and after a time period, determining whether the at least one check volume has a pressure less than a tolerance below the selected vacuum level.

12. The method for testing a fuel injector of claim 11, wherein the selected vacuum level is in the range of about 25 inches Hg (635 Torr) through about 29 inches Hg (737 Torr), wherein the time period is in the range of about 5 minutes through about 7 minutes, and wherein the tolerance is in the range of about 0 through about 0.5 inches of Hg (11 Torr).

13. A method for testing a fuel injector, comprising the steps of:

mechanically isolating at least one test volume of a fuel injector that is disposed in within a sleeve having an inside surface;

changing an amount of air in the at least one test volume by using an air displacement mechanism connected to the test volume through a tube; and testing the at least one test volume for air leakage;

removing the fuel injector from the sleeve;

inserting a test plug in the sleeve;

mechanically isolating at least one check volume of the test plug with the sleeve;

changing the amount of air in the at least one check volume by using the air displacement mechanism connected to the check volume through the tube; and testing the at least one check volume for air leakage.

14. The method for testing a fuel injector of claim 13, wherein the step of changing an amount of air in the at least one test volume includes:

connecting an air passage to the tube;

connecting an air pump to the air passage;

attaching a pressure gauge to the air passage;

connecting a valve to the air passage, the valve disposed between the air pump and the pressure gauge;

operating the air pump.

* * * * *